Figure 1:
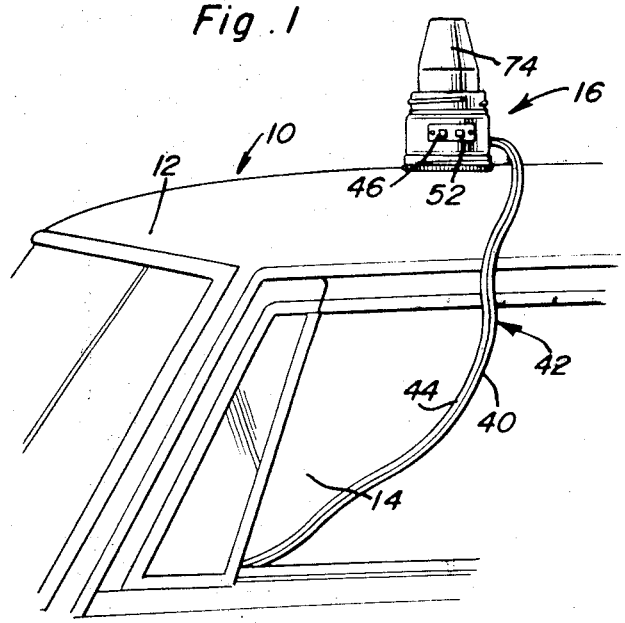

United States Patent

[11] 3,622,979

[72] Inventor Robert P. Dickerson
 Hoisington, Kans.
[21] Appl. No. 860,317
[22] Filed Sept. 23, 1969
[45] Patented Nov. 23, 1971
[73] Assignee C. H. Carmichael
 Hoisington, Kans.
 a part interest

[54] DISTRESS LIGHT WITH SELECTIVELY USEABLE COLORED LENSES
 3 Claims, 4 Drawing Figs.

[52] U.S. Cl. .................................................. 340/81,
 340/118, 340/321, 340/333, 340/383
[51] Int. Cl. ........................................................ B60q 7/00,
 F21l 15/04
[50] Field of Search............................................. 350/316;
 240/10.6 SD, 8.18, 46.59; 340/74, 81, 84, 87, 321,
 383, 118

[56] References Cited
 UNITED STATES PATENTS

| | | | |
|---|---|---|---|
| 1,021,716 | 3/1912 | Cushman ..................... | 206/65 K |
| 2,420,307 | 5/1947 | Fristoe ........................ | 340/321 |
| 2,472,850 | 6/1949 | Plant ........................... | 240/46.59 |
| 2,589,747 | 3/1952 | Tedeschi ..................... | 340/321 |
| 2,878,462 | 3/1959 | Tralli .......................... | 340/81 X |
| 2,987,702 | 6/1961 | Yohe ........................... | 340/81 |
| 3,034,098 | 5/1962 | Clasen ......................... | 340/81 |
| 3,063,046 | 11/1962 | Hurst ........................... | 340/81 X |
| 3,221,162 | 11/1965 | Heenan et al. ............... | 340/383 X |
| 3,262,596 | 7/1966 | Zillmann ...................... | 206/4 X |
| 3,488,630 | 1/1970 | Decker et al. ................ | 340/81 X |

FOREIGN PATENTS

| | | | |
|---|---|---|---|
| 1,364,423 | 5/1964 | France ......................... | 240/46.59 |

*Primary Examiner*—John W. Caldwell
*Assistant Examiner*—Kenneth N. Leimer
*Attorneys*—Clarence A. O'Brien and Harvey B. Jacobson ABSTRACT: A distress light including a housing provided with a top wall from which electrically actuatable illumination means project. A plurality of generally cup-shaped lenses of different colors are provided and may be nested within each other and inverted over the illumination means. Further, the housing includes a removable retaining ring operative to releasably retain either one or all of the inverted cup-shaped lenses over the illumination means.

The distress light, while readily useable in many other environments for rendering a visual distress signal, has been specifically designed to provide an assemblage which may be compactly stored in a motor vehicle and utilized by a disabled motorist for signalling caution or requesting various types of aid. The distress light includes a pair of illumination assemblies, one being adapted to receive its power from a motor vehicle storage battery and the other being operable from a self-contained small battery source of electrical potential contained within the housing of the distress light. In this manner, an extremely dependable distress light is provided and it is to be further noted that the distress light is to be marketed with a plurality of different colored lenses for enclosing the illumination means of the distress light. The different color lenses may include a red lens for signalling the need for medical aid, a green lens for signalling a need for police aid, a blue lens for signalling a need for mechanical aid and an amber or yellow lens for signalling "caution" where no assistance is required. In addition to the above, the illumination means operative from both the associated vehicle battery and the self-contained source of electrical potential include electrically actuated automatic cycling switch means serially connected between the sources of electrical potential and the illumination means whereby the latter will be alternately actuated.

PATENTED NOV 23 1971 3,622,979

Green
Yellow
Blue
Red

Robert P. Dickerson
INVENTOR

BY Clarence A. O'Brien
and Harvey B. Jacobson
Attorneys

DISTRESS LIGHT WITH SELECTIVELY USEABLE COLORED LENSES

The main object of this invention is to provide a distress light that may be readily utilized by substantially all motorists for signalling "caution" or requesting various types of aid.

Another object of this invention, in accordance with the immediately preceding object, is to provide a distress light including two illumination means with one being electrically actuated from a self-contained source of electrical potential and the other being adapted to be electrically actuated by the storage battery of an associated motor vehicle.

A still further object of this invention, in accordance with the immediately preceding object, is to provide a distress light having a first illumination means operable intermittently in quick succession and powered by a self-contained source of electrical potential and a second illumination means adapted to be powered by the storage battery of the associated motor vehicle, with the second illumination means being readily adaptable for use in conjunction with motor vehicles having storage batteries of different voltage merely by utilizing a bulb of the correct voltage in the second illumination means.

Another object of this invention is to provide a distress light constructed in a manner whereby it may be readily supported from substantially any metallic body portion of an associated motor vehicle against dislodgement by vibration or wind.

Yet another object of this invention is to provide a distress light including a plurality of selectively useable different colored lenses and which may be simultaneously anchored to the housing of the distress light in compact nested relation when the distress light is to be stored.

A final object of this invention to be specifically enumerated herein is to provide a distress light in accordance with the preceding objects which will conform to conventional forms of manufacture, be of simple construction and easy to use so as to provide a device that will be economically feasible, long lasting and relatively trouble-free in operation.

Figure 2:
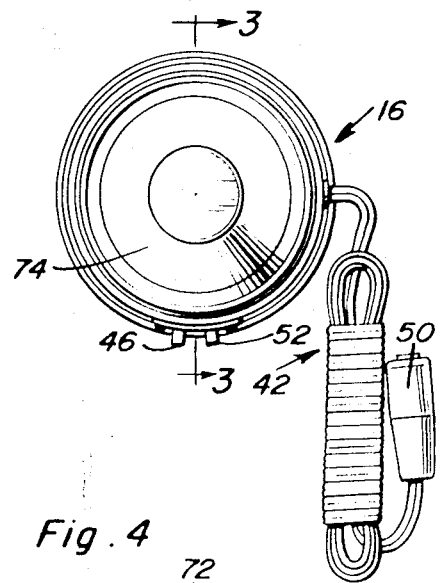
Figure 3:
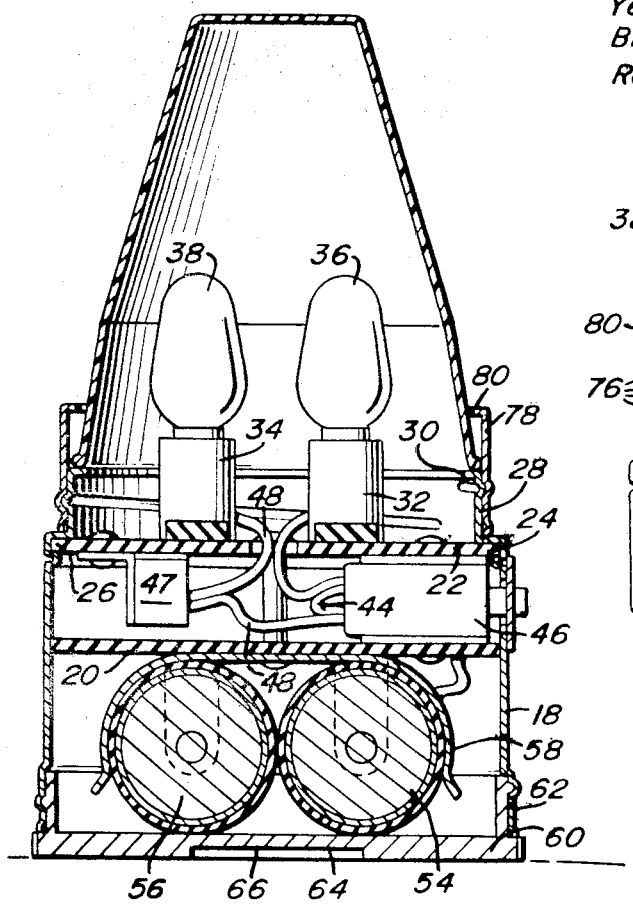
Figure 4:
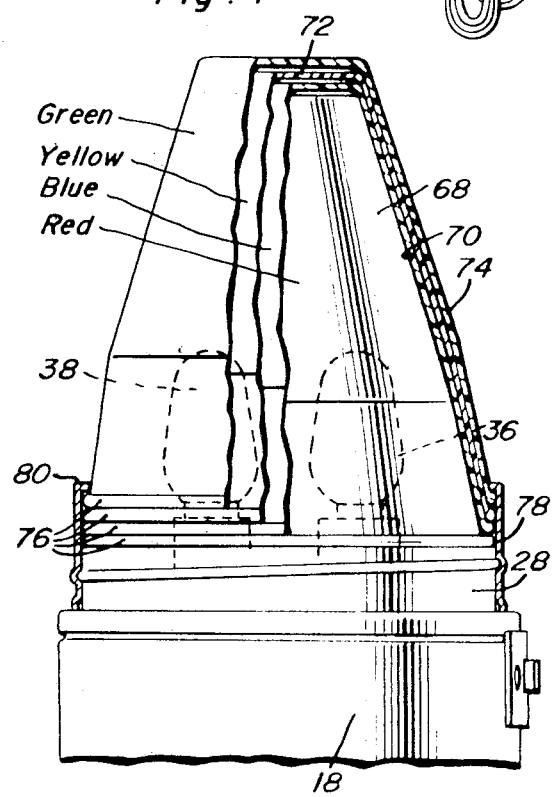

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side perspective view of a conventional form of passenger motor vehicle with the distress light of the instant invention positioned on the upper surface of the metallic roof of the motor vehicle and the extension cord of the distress light extending to the inside of the passenger compartment of the motor vehicle for suitable connection with the electrical system of the motor vehicle;

FIG. 2 is a top plan view of the distress light;

FIG. 3 is an enlarged vertical sectional view taken substantially upon the plane indicated by the section line 3—3 of FIG. 2 and with only one of the lenses in position supported from the housing of the distress light; and FIG. 4 is a fragmentary elevational view of the distress light with all of the nested colored lenses supported from the housing of the light and portions of three of the lenses and the retaining ring for all of the lenses being broken away and illustrated in vertical section.

Referring now more specifically to the drawings, the numeral 10 generally designates a conventional form of motor vehicle which includes a top 12 and an interior passenger compartment 14.

The distress light of the instant invention is referred to in general by the reference numeral 16 and is illustrated in FIG. 1 of the drawings as mounted on the upper surface of the top 12. The distress light 16 includes a generally cylindrical housing 18 which is disposed upright and has a lower partition 20 supported therein intermediate its axial ends by means of a fastener 22 secured through the partition 20 and an upper partition 24 seated within an annular inwardly opening groove 26 formed in the upper end of the housing 18 immediately beneath a diametrically reduced and externally threaded upper end neck portion 28 at the upper end of the housing 18.

The upper extremity of the neck portion 28 includes an inwardly directed and circumferentially extending flange 30 and a pair of light sockets 32 and 34 in which light bulbs 36 and 38 are secured have their lower ends supported from the upper partition 24.

The socket 34 is grounded to one conductor 40 of an extension cord referred to in general by the reference numeral 42 and the other conductor 44 of the extension cord 42 is electrically connected to a first on-off switch 46 supported from the partition 22 beneath the latter and above the partition 20. A conductor 48 extends from the switch 46 to an electrically actuated cycling switch 47 and a further conductor 48 extends from the cycling switch 47 to the interior of the socket 34 for engagement by the center terminal (not shown) of the bulb 38. Accordingly, when the plug 50 on the end of the extension cord 42 remote from the housing 18 is plugged into the cigarette lighter receptacle (not shown) of the vehicle 10, the bulb 38 will be caused to blink on and off, when the on-and-off switch 46 is closed. In addition, a second switch 52, similar to the switch 46 is also provided together with a second electrically actuated cycling switch (not shown) by which the bulb 36 may be electrically connected to the source of electrical potential represented by the flashlight batteries 54 and 56 supported by means of a suitable clip structure 58 dependingly supported from the undersurface of the partition 20. The interior of the housing in which the storage batteries 54 and 56 are disposed is closed by a bottom wall 60 which is removably threadedly engaged with the internally threaded lower end portion 62 of the housing 18 and the bottom wall 60 includes a permanent magnet 64 secured in a downwardly opening recess 66 formed in the undersurface of the bottom wall 60. Accordingly, the base or lower end of the housing 18 may be readily magnetically secured to any ferrous material.

With attention now invited more specifically to FIGS. 3 and 4 of the drawings, it may be seen that there are four cup-shaped lenses 68, 70, 72 and 74 provided on the distress light 16. The lenses are generally truncated cone-shaped in configuration and include end walls at their minor diameter ends. Further, as illustrated in FIG. 4, the lenses may b readily compactly nested and each lens includes a radially outwardly projecting and circumferentially extending rib 76 on its major diameter end portion whereby the lowermost lens disposed over the top wall of the housing 18 defined by the partition 22 may have its lower end rested upon the flange 30.

A generally cylindrical retaining ring 78 is provided and is internally threaded at one end and includes a radially inwardly projecting circumferential flange 80 on its other or upper end. The retaining ring 78 may have its internally threaded end threadedly engaged with the externally threaded neck portion 28 with the flange 80 overlying the uppermost rib 76.

In operation, when it is desired to utilize the distress light the light is removed from its storage place within the vehicle 10 and the retaining ring 78 is removed so as to enable all of the stacked lenses 68, 70, 72 and 74 to be removed. Then, the desired color lens is placed over the bulbs 36 and 38 and with the rib 76 thereof abutting the flange 30. Then, the retaining ring 78 is downwardly telescoped over the selected lens and threadedly engaged with the neck portion 28. In this manner, the flange 80 will overlie the rib 76 of the lens disposed over the bulbs 36 and 38 and prevent removal of that lens. Then, the desired switch, switch 46 or switch 52, may be actuated to cause the corresponding bulb to be illuminated.

As previously hereinbefore set forth, the lower end of the housing defined by the bottom wall 60 may be readily magnetically supported from any suitable ferrous surface such as the upper surface of the top 12 of the vehicle 10. After the distress light has served its purpose, the retaining ring 78 may again be removed and the three unused lenses may be telescoped downwardly over the lens which was used and the ring 78 may then be replaced after which the assembled distress light may be stored in a compact manner.

Although it is desired that the light 16 be mounted upon a ferrous surface wherein it will be magnetically attracted to that surface, it will be noted that the construction of the light 16 is such that the greater portion of the weight thereof is placed considerably below the vertical center of the light. Therefore, even when a ferrous surface is not available, the light 16 may be readily supported from a substitute surface against accidental dislodgement therefrom by wind or vibration.

Further, should it be desired to utilize the light 16 during the daylight hours, both of the bulbs 36 and 38 may be actuated in order to increase the brilliance of the light and therefore make it more readily viewable in the daytime. Also, inasmuch as the light 16 includes four different colored lenses for signalling "caution" or that one of three different types of aid is being requested, it is intended that the three variously colored lenses to be utilized in signalling for aid be standardized throughout the country whereby all motorists will be aware of what type of aid is required when a colored lens requesting aid is utilized on the light 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A distress light including an upstanding housing provided with an upper wall portion, electrically actuatable illumination means supported from the upper surface of said upper wall portion and projecting upwardly therefrom, a plurality of different colored and nestable inverted downwardly opening generally cup-shaped lenses removably positioned over said illumination means enclosing the latter with said lenses opening downwardly toward said one wall portion, said housing including means removably supported therefrom and operable to coact with said lenses for releasably retaining any number of said lenses on said housing in position enclosing said illumination means, said upper wall portion including an upstanding upwardly projecting neck portion supported therefrom and encircling the lower extremities of said illumination means, said neck portion including an upper end inwardly directed flange, the lower open ends of said lenses including radially outwardly projecting and circumferentially extending beads of generally the same diameter and vertically stacked relative to each other, the lowermost bead of said lenses being abutted against and supported from the flange carried by the upper end of said neck portion, said neck portion being externally threaded and said means removably supported from said housing for releasably retaining the lenses thereon including an axially elongated upstanding retainer ring, said ring being internally threaded and having its lower end removably threadedly supported from the external threads of said neck portion, the upper end of said ring including an inwardly directed flange overlying the uppermost bead of said lenses, the axial extent of the threads upon said neck portion and ring being such to allow said inwardly directed flange on the upper end of said ring to overlie the uppermost bead of said lenses when all of said lenses are supported in nested position on the inwardly directed flange carried by said neck portion.

2. The combination of claim 1 wherein said illumination means comprises a light bulb, a self-contained source of electrical potential disposed within said housing, and conductor means operative to selectively electrically connect said light bulb with said source.

3. The combination of claim 1 wherein said illumination means comprises a light bulb, and flexible elongated conductor means electrically connected to said light bulb at one end and adapted for electrical connection with a remote source of electrical potential at its other end, said conductor means including electrically actuated cycling switch means serially connected therein.

* * * * *